United States Patent
Zbiciak (10) Patent No.: US 7,315,261 B2
(45) Date of Patent: Jan. 1, 2008

(54) METHOD FOR CONVERTING DATA FROM PIXEL FORMAT TO BITPLANE FORMAT

(75) Inventor: Joseph R. Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 755 days.

(21) Appl. No.: 10/884,461

(22) Filed: Jul. 2, 2004

(65) Prior Publication Data
US 2005/0038910 A1 Feb. 17, 2005

Related U.S. Application Data

(60) Provisional application No. 60/484,395, filed on Jul. 2, 2003.

(51) Int. Cl.
*H03M 7/00* (2006.01)

(52) U.S. Cl. .................... 341/50; 712/300

(58) Field of Classification Search ............. 341/50, 341/106, 55, 60; 382/283; 712/300, 228
See application file for complete search history.

(56) References Cited

U.S. PATENT DOCUMENTS

| | | | | |
|---|---|---|---|---|
| 5,966,138 A | * | 10/1999 | Tanaka | 345/658 |
| 6,067,613 A | | 5/2000 | Balmer | 712/32 |
| 6,437,712 B1 | * | 8/2002 | Aoki | 341/67 |
| 6,444,483 B1 | * | 9/2002 | Minemura et al. | 438/24 |
| 6,728,741 B2 | | 4/2004 | Keay | 708/401 |
| 6,745,319 B1 | | 6/2004 | Balmer et al. | 712/223 |
| 6,816,961 B2 | * | 11/2004 | Rice et al. | 712/223 |

OTHER PUBLICATIONS

Henry S. Warren, Jr., Hacker's Delight, *Transposing a Bit Matrix*, ISBN 0-201-91465-4, 2003, pp. 108-117.

* cited by examiner

*Primary Examiner*—Peguy JeanPierre
(74) *Attorney, Agent, or Firm*—Robert D. Marshall, Jr.; W. James Brady; Frederick J. Telecky, Jr.

(57) ABSTRACT

This invention efficiently converts normal pixel data into bit plane data. A sequence of pack, bitwise shuffle, masking, rotate and merging operations transform tile from pixel form to bit plane form. This enables downstream algorithms to read only the data for the bit plane of interest. This greatly reduces the memory bandwidth bottleneck and opens many new optimization pathways.

4 Claims, 8 Drawing Sheets

| Ref | 31 | 24 23 | 16 15 | 9 8 | 0 | Label |
|---|---|---|---|---|---|---|
| 150 | | A7A6A5A400000000 | C7C6C5C400000000 | E7E6E5E400000000 | G7G6G5G400000000 | p7654_ACEG_ |
| 151 | | 00000000B7B6B5B4 | 00000000D7D6D5D4 | 00000000F7F6F5F4 | 00000000H7H6H5H4 | p7654_BDFH_ |
| 152 | | I7I6I5I400000000 | K7K6K5K400000000 | M7M6M5M400000000 | O7O6O5O400000000 | p7654_IKMO_ |
| 153 | | 00000000J7J6J5J4 | 00000000L7L6L5L4 | 00000000N7N6N5N4 | 00000000P7P6P5P4 | p7654_JLNP_ |
| 154 | | A3A2A1A000000000 | C3C2C1C000000000 | E3E2E1E000000000 | G3G2G1G000000000 | p30_ACEG_ |
| 155 | | 00000000B3B2B1B0 | 00000000D3D2D1D0 | 00000000F3F2F1F0 | 00000000H3H2H1H0 | p3210_BDFH_ |
| 156 | | I3I2I1I000000000 | K3K2K1K000000000 | M3M2M1M000000000 | O3O2O1O000000000 | p3210_IKMO_ |
| 157 | | 00000000J3J2J1J0 | 00000000L3L2L1L0 | 00000000N3N2N1N0 | 00000000P3P2P1P0 | p3210_JLNP |

METHOD FOR CONVERTING DATA FROM PIXEL FORMAT TO BITPLANE FORMAT

CLAIM OF PRIORITY

This application claims priority under 35 U.S.C. 119(e)(1) to U.S. Provisional Application No. 60/484,395 filed Jul. 2, 2003.

TECHNICAL FIELD OF THE INVENTION

The technical field of this invention is computer graphics.

BACKGROUND OF THE INVENTION

A bit plane is a horizontal slice through the data, collecting the values of a given bit position from all of the data values in the set. For example, consider an array filled with 1000 elements of 16-bit data. This array can be divided this into 16 1000-bit arrays, the first of which would have all of bits for bit-position 0, the next would have all of the bits for bit-position 1, etc. Each of these 16 1000-bit arrays is a bit plane.

The invention is embodied in a code sequence that converts a sequence of N bit numbers and produces a set of N bitmaps. The N bits of each number are generally stored together in a single storage unit such as a single memory location. Each bitmap contains one bit plane from the original data set.

This invention effectively converts N-bit data (where N is a power of 2) into a set of bit planes. This operation is useful for multiple problems. Certain modulation schemes assert data in bit-plane order as a simple means of analog-to-digital conversion. A Digital Light Processor based on the Texas Instruments' Digital Mirror Device uses this type of operation. In this context, the operation is sometimes referred to as corner turning. Certain image-coding schemes encode images in bit planes. These schemes would benefit from the planarized encoding. For 1-bit image data, this operation is equivalent to image transposition on N-bit wide tiles. This invention requires little modification to support this secondary use.

Bit-plane oriented schemes usually make poor use of memory bandwidth. To read a given bit position across an entire data set, prior art schemes read the entire data set, extract the bit of interest and discard the other bits. This process must be repeated for each bit plane. These prior art schemes read about N times as much data as actually used for N-bit data elements.

Traditional solutions to planarization can only effectively process one bit-plane at a time. The straight forward implementation reads the data N times. Even if all N bit planes are extracted the first time the data is read, the extraction process usually operates only one bit at a time.

Thus there is a need in the art for an efficient conversion process from pixel format data to bit plane format data. Such an efficient conversion process would make other processes feasible that are now limited by the computation cost of this planarization.

SUMMARY OF THE INVENTION

This invention efficiently converts normal pixel data into bit plane data. This enables downstream algorithms to read only the data for the bit plane of interest. This greatly reduces the memory bandwidth bottleneck and opens many new optimization pathways.

This invention uses sequence of pack, bitwise shuffle, masking, rotate and merging operations to transform a 16-bit by 16-bit tile from pixel form to bit plane form at a rate of 1 tile in 12 instruction cycles. This is equivalent to planarizing sixteen 16-bit bins. Due to minor changes in memory addressing, full planarization requires approximately 14 cycles for an equivalent amount of data.

This application illustrates the invention with an example of planarizing 16-bit data. Although this example operates on 16-bit data, the algorithm can be modified to work with smaller or larger data sizes. The most common pixel data sizes are 8-bit and 16-bit. The following includes a description of the algorithm together with example code for an inner loop.

A bitwise shuffle instruction SHFL allows effective sort of the bit-planes in parallel. This achieves very high efficiency. The prior art approach employs the fundamentally information-losing activity of extracting one bit of interest and discarding the rest. Thus the prior art produces much greater memory traffic. This invention moves all the bits together. In each step all bits move closer to their final destination. As a result, this invention can corner turn or planarize data more than ten times faster than the estimated operational rate of the prior art approach.

BRIEF DESCRIPTION OF THE DRAWINGS

These and other aspects of this invention are illustrated in the drawings, in which.

DETAILED DESCRIPTION OF PREFERRED EMBODIMENTS

This invention uses sequence of pack, bitwise-shuffle, masking, rotate and merging operations available on a Texas Instruments TMS320C6400 digital signal processor to transform a 16-bit by 16-bit tile from pixel form to bit plane form at a rate of 1 tile in 12 instruction cycles. This is equivalent to planarizing sixteen 16-bit bins. Due to minor changes in memory addressing, full planarization requires approximately 14 cycles for an equivalent amount of data.

This application will illustrate an example of planarizing 16-bit data. Although this example operates on 16-bit data, the algorithm can be modified to work with smaller or larger data sizes. The most common pixel data sizes are 8-bit and 16-bit. The following includes a description of the algorithm together with unscheduled code for an inner loop. This example code is correct except it omits the initial read of data into the registers and the final write out of the transformed data from the registers to memory. The example code uses mnemonics for the registers. These must be changed to actual, physical registers for scheduled code. One skilled in the art of digital signal processor programming would understand how to produce actual, scheduled code for a particular digital signal processor from this description.

Figure 1:
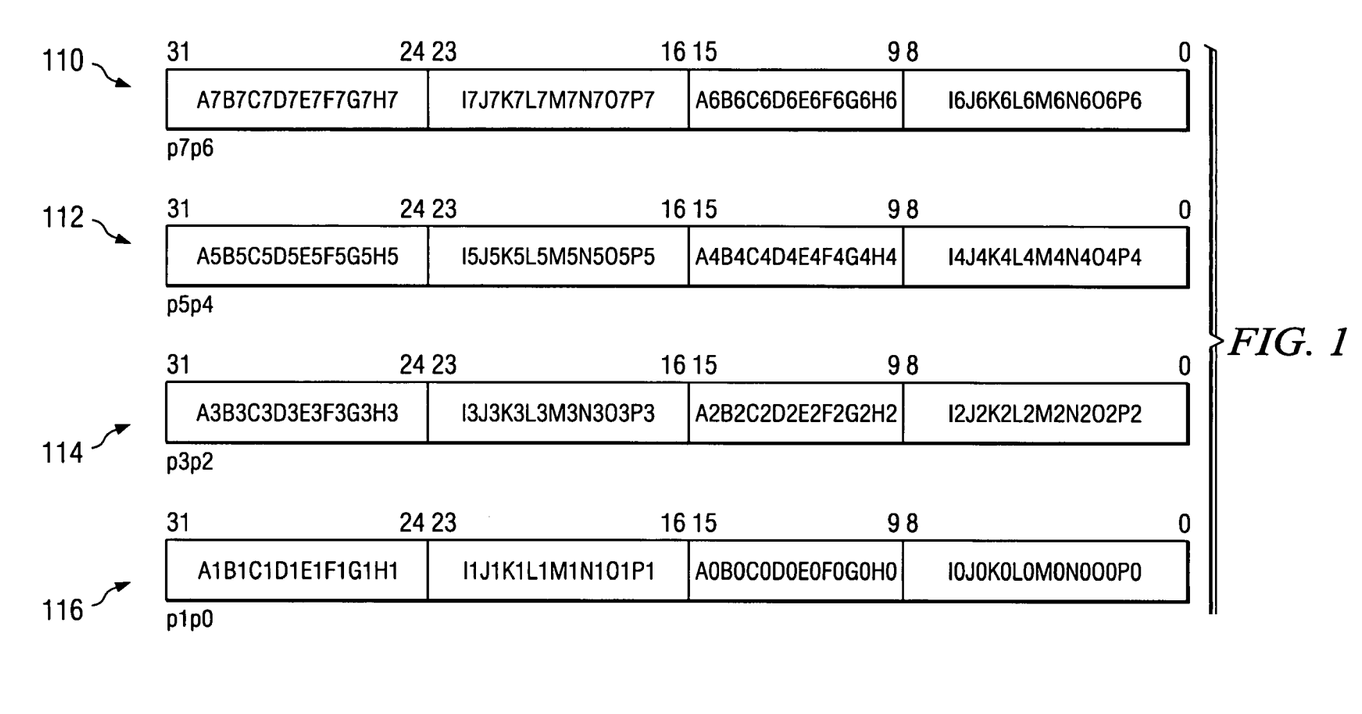
FIG. 1 illustrates the starting bit arrangement of a set of example pixels in four data words in an example of use of this invention.

This invention converts packed pixels in normal format into packed data with the bit planes exposed. This invention will be described with an example beginning with 8 pixels p7 to p0. These eight pixels each have 16 bits A through P. FIG. 1 illustrates the initial configuration of pixels p7 to p0 in four 32-bit data words. The 16 bits of pixel p7 are packed into the 16 most significant bits of data word 110 (p7p6). The 16 bits of pixel p6 are packed into the 16 least significant bits of data word 110 (p7p6). Pixels p5 and p4 are packed into respective upper and lower halves of data word 112 (p5p4). Pixels p3 and p2 are packed into respective upper and lower halves of data word 114 (p3p2). Pixels p1 and p0 are packed into respective upper and lower halves of data word 116 (p1p0).

Figure 2:
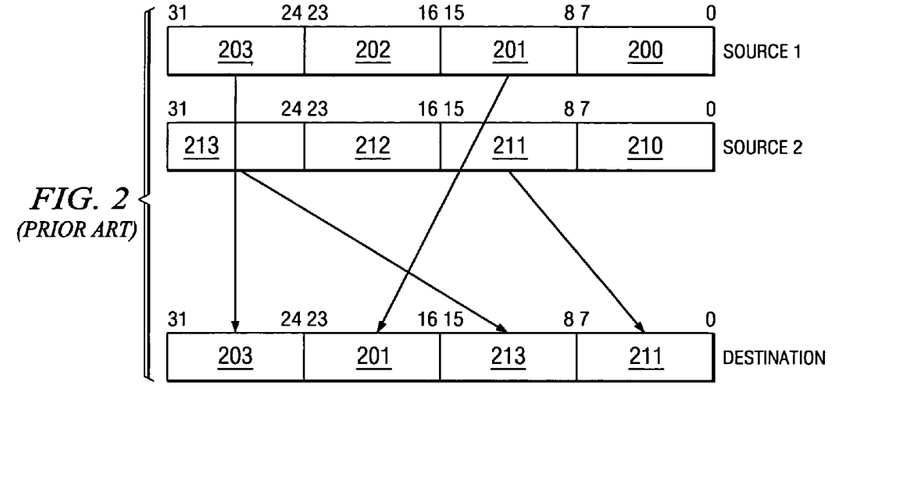
FIG. 2 illustrates the data operation of a known instruction that packs the high bytes of the two half-words of two source operands into a destination operand.
Figure 3:
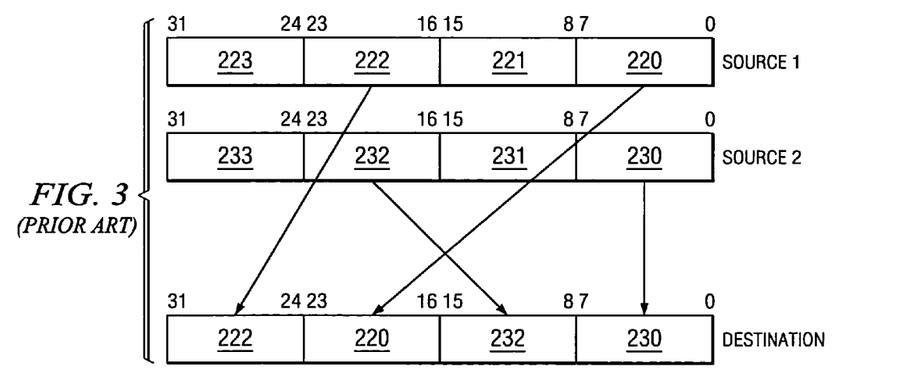
FIG. 3 illustrates the data operation of a known instruction that packs the low bytes of the two half-words of two source operands into a destination operand.

FIGS. 2 and 3 illustrate two known data manipulation instructions used in this invention. These instructions are available on the Texas Instruments TMS320C6400 family of digital signal processors. FIG. 2 illustrates an instruction called PACKH4 or pack high in four parts. As illustrated in FIG. 2, this instruction takes the upper byte (8 bits) from each 16-bit word of the two source operands source1 and source2 and stores them in respective bites of the destination operand. Specifically, the high byte 203 of the upper half-word of source1 is moved to the upper byte of the upper half-word of the destination. The high byte 201 of the lower half-word of source1 is moved to the lower byte of the upper half-word of the destination. The high byte 213 of the upper half-word of source2 is moved to the upper byte of the lower half-word of the destination. The high byte 211 of the lower half-word of source2 is moved to the lower byte of the lower half-word of the destination.

FIG. 3 illustrates an instruction called PACKL4 or pack low in four parts. The low byte 222 of the upper half-word of source1 is moved to the upper byte of the upper half-word of the destination. The low byte 220 of the lower half-word of source1 is moved to the lower byte of the upper half-word of the destination. The low byte 232 of the upper half-word of source2 is moved to the upper byte of the lower half-word of the destination. The low byte 230 of the lower half-word of source2 is moved to the lower byte of the lower half-word of the destination.

The planarization applies these two instructions to the four starting registers as follows:

| PACKH4 | p7p6, p5p4, p7654H |
| PACKL4 | p7p6, p5p4, p7654L |
| PACKH4 | p3p2, p1p0, p3210H |
| PACKL4 | p3p2, p1p0, p32101 |

Figure 4:
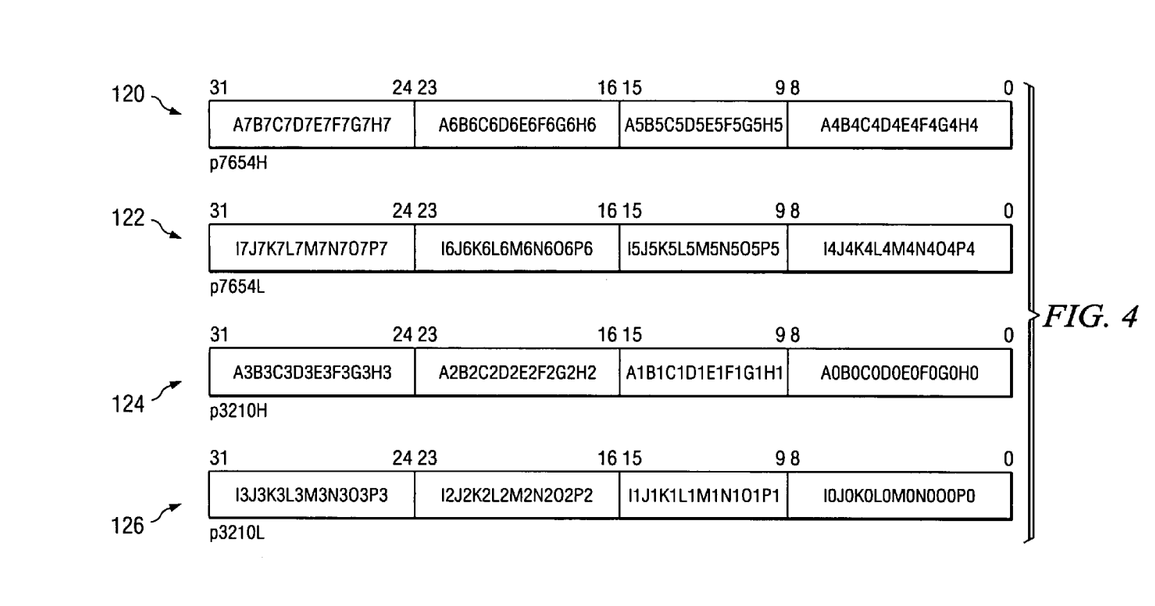
FIG. 4 illustrates the results of the pack data instructions of the prior art illustrated in FIGS. 2 and 3 as used in this invention on the data illustrated in FIG. 1.

Thus each pair of registers is transformed into another pair of registers. The data of each pair of initial registers in included in the corresponding destination pair of registers. FIG. 4 illustrates the results of applying these four instructions to the four registers of FIG. 1. Data word 120 includes the first 8 bits (A to H) of pixels 4 to 7. Data word 122 includes the last 8 bits (I to P) of pixels 4 to 7. Data word 124 includes the first 8 bits (A to H) of pixels 0 to 3. Data word 126 includes the last 8 bits (I to P) of pixels 0 to 3.

Figure 5:
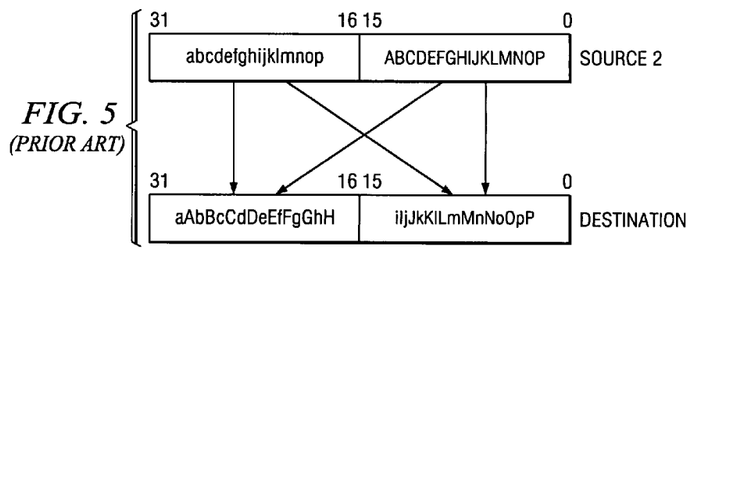
FIG. 5 illustrates the operation of a shuffle instruction of the prior art used in this invention.

The algorithm next uses a shuffle instruction. FIG. 5 illustrates the operation of this shuffle instruction. This resembles the shuffling of a deck of cards as the 16 most significant bits of a single operand register source2 are interleaved with the 16 least significant bits of this register into the destination register. All bits of the original source2 register appear in the destination register with a different bit order. Each of the four registers is shuffled using this instruction as follows:

| SHFL | p7654H, p7654H1 |
| SHFL | p7654L, p7654L1 |
| SHFL | p3210H, p3210H1 |
| SHFL | p3210L, p3210L1 |

Figure 6:
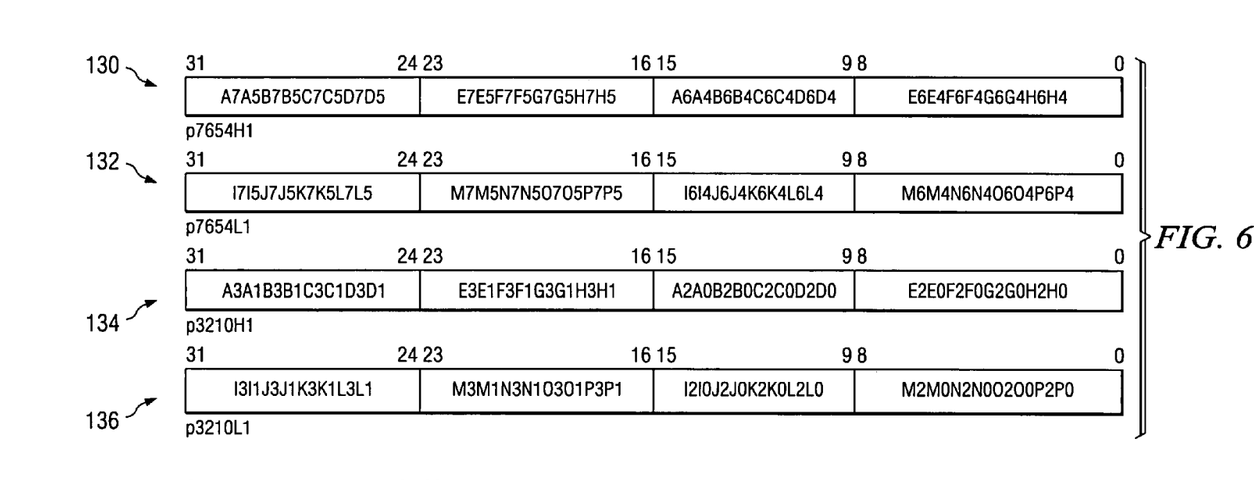
FIG. 6 illustrates the pixel arrangement of four data words of the example of this invention following a first shuffle operation.
Figure 7:
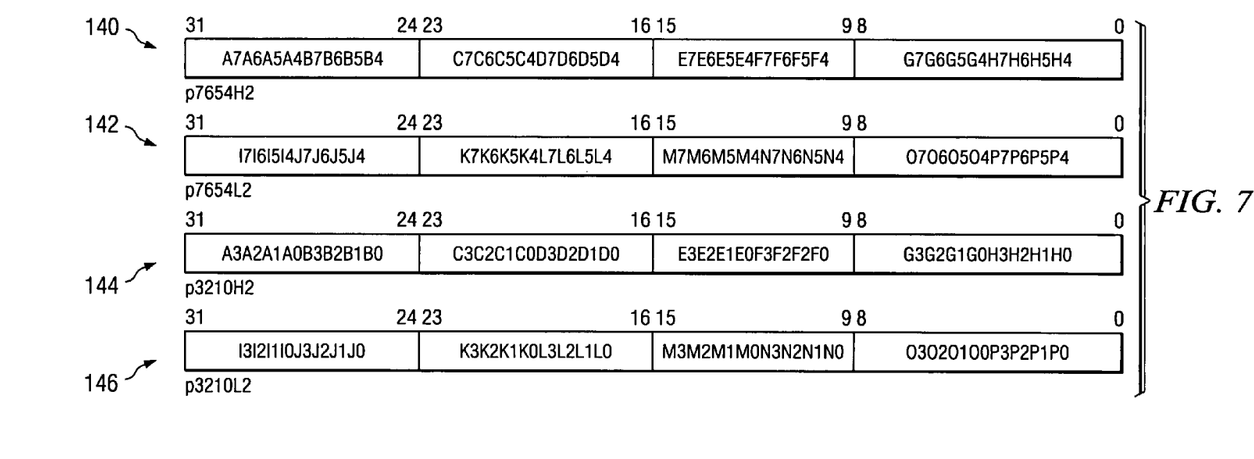
FIG. 7 illustrates the pixel arrangement of four data words of the example of this invention following a second shuffle operation.

FIG. 6 illustrates the results of shuffling the four data word 120, 122, 124 and 126 resulting in respective data words 130, 132, 134 and 136. These four intermediate registers are shuffled again using the same instruction as follows:

| SHFL | p7654H1, p7654H2 |
| SHFL | p7654L1, p7654L2 |
| SHFL | p3210H1, p3210H2 |
| SHFL | p3210L1, p3210L2 |

Figure 8:
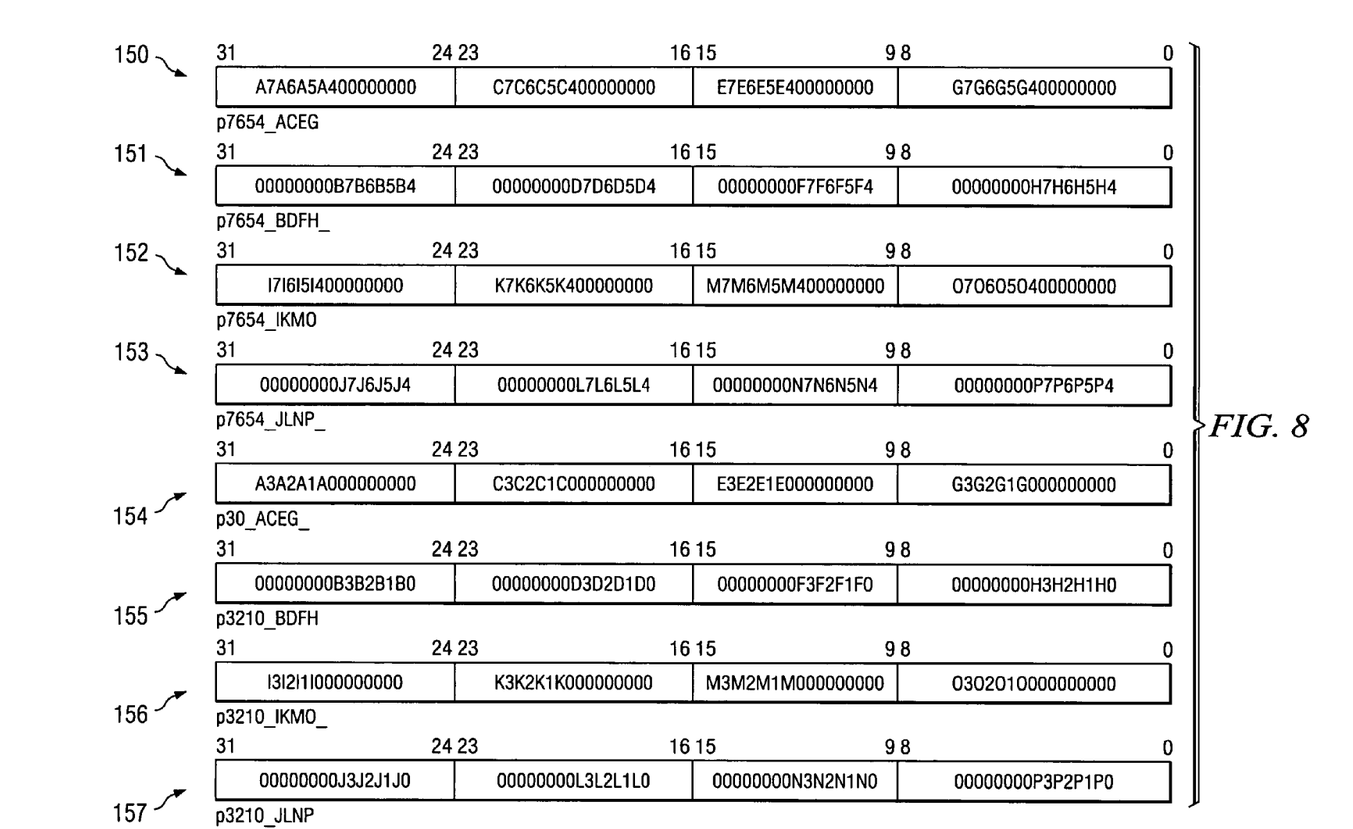
FIG. 8 illustrates the pixel arrangement of eight data words of the example of this invention following a masking arrangement.

FIG. 7 illustrates the results of this second shuffle operation of data words 130, 132, 143 and 136 resulting in respective data words 140, 142, 144 and 146. As shown in FIG. 7 the data for the individual planes (A, B, C, D, E, F, G, H, I, J, K, L, M, N, O and P) are mostly together but in upper pixels p7 to p4 and lower pixels p3 to p0. Each of these four registers is then masked twice to produce eight intermediate register results. The first masking is accomplished with a logical AND instruction between the intermediate register and a constant mF0F0. This constant "11110000111100001111" is doubled to fill the 32 bits of the arithmetic logic unit. The second masking is accomplished with a logical ANDN instruction which uses the logical inverse of the constant mF0F0. These instructions are as follows:

```
AND     p7654H2, mF0F0, p7654_ACEG
ANDN    p7654H2, mF0F0, p7654_BDFH_
AND     p7654L2, mF0F0, p7654_IKMO
ANDN    p7654L2, mF0F0, p7654_JLNP_
AND     p3210H2, mF0F0, p3210_ACEG_
ANDN    p3210H2, mF0F0, p3210_BDFH
AND     p3210L2, mF0F0, p3210_IKNO_
ANDN    p3210L2, mF0F0, p3210_JLNP
```

Figure 9:
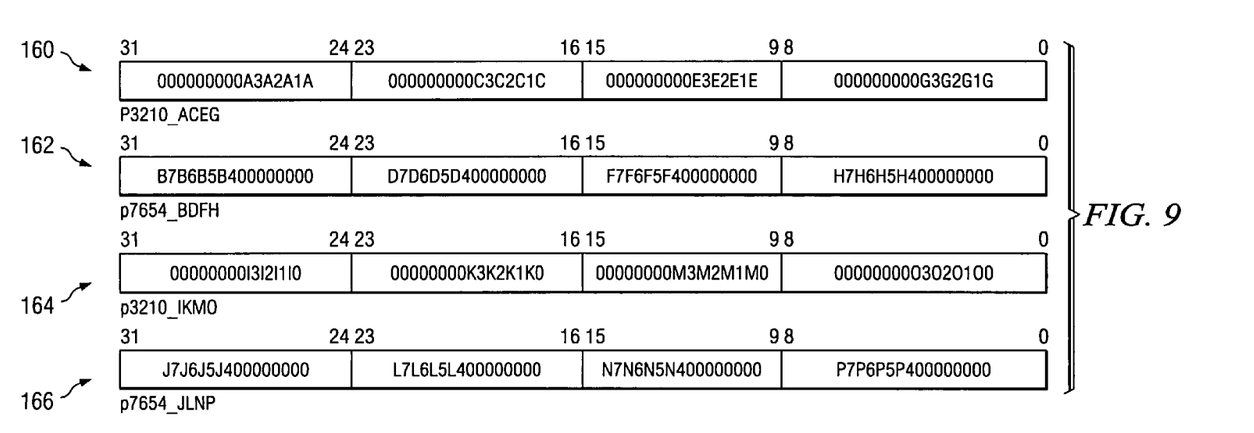
FIG. 9 illustrates the pixel arrangement of four data words of the example of this invention following a shift operation.

FIG. 8 illustrates the results of these masking instructions in data words 150, 151, 152, 153, 154, 155, 156 and 157. Note that: data word 140 is masked twice producing data words 150 and 151; data word 142 is masked twice producing data words 152 and 153 ; data word 144 is masked twice producing data words 154 and 155; and data word 146 is masked twice producing data words 156 and 157. Each four bit plane bits are now isolated within an 8-bit quarter of the data word. Half of these data words are shifted to align with the "0" bits of a corresponding data word. Two data words are right shifted four bits (SHRU) with the "U" indicating unsigned data so that the vacated bits are zero filled and two data words are left shifted four bits (SHL) with the vacated bits zero filled as follows:

```
SHRU    p3210_ACEG_, 4, p3210_ACEG
SHL     p7654_SDFH_, 4, p7654_BDFH
SHRU    p3210_IKLO_, 4, p3210_IKMO
SHL     p7654_JLNP_, 4, p7654_JLNP
```

Figure 10:
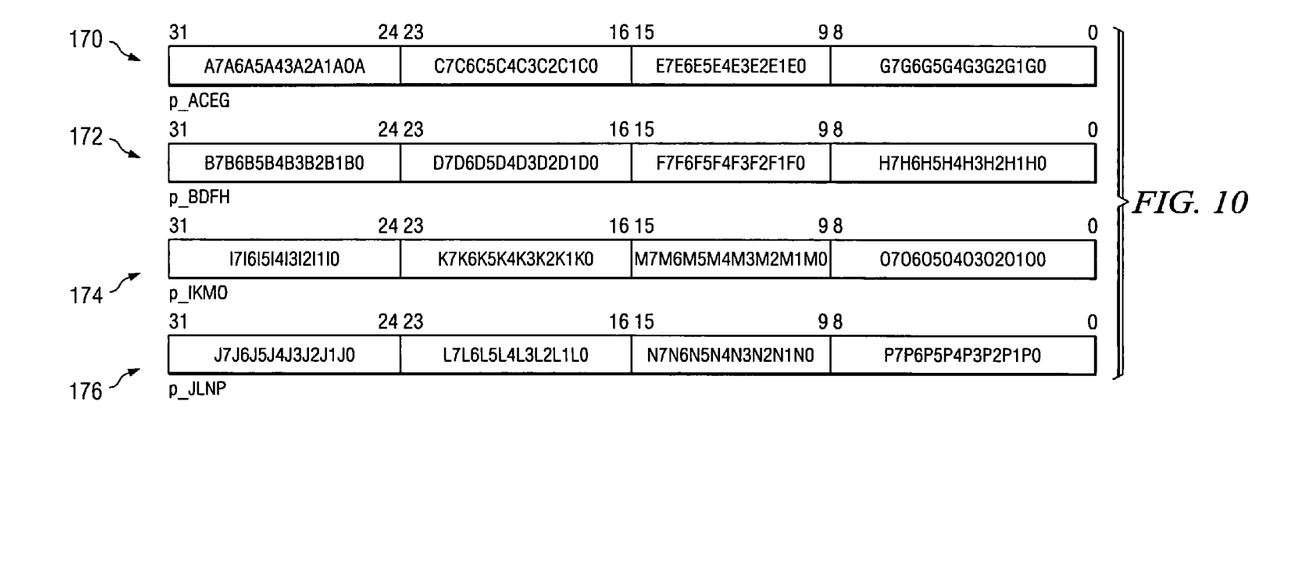
FIG. 10 illustrates the pixel arrangement of four data words of the example of this invention at the completion of this invention.

The four results of the shift operations are illustrated in FIG. 9 as data words 160, 162, 164 and 166. Data word 154 is right shifted 4 bits to become data word 160. Data word 151 is left shifted 4 bits to become data word 162. Data word 156 is right shifted 4 bits to become data word 164. Data word 153 is right shifted 4 bits to become data word 166. The pixel data for each bit plane are now in position for combining. Four data words 150, 152, 154 and 156 shown in FIG. 8 are combined with corresponding data words 160, 162, 164 and 166 shown in FIG. 9 as follows:

```
ADD     p7654_ACEG, p3210_ACEG, p_ACEG
ADD     p7654_BDFH, p3210_BDFH, p_BDFH
ADD     p7654_IKMO, p3210_IKMO, p_IKMO
ADD     p7654_JLNP, p3210_JLNP, p_JLNP
```

FIG. 10 illustrates the results of these ADD instructions as data words 170, 172, 174 and 176. Because the masking places zeros of one operand opposite the data of the other operand, the result is combination of the data. A bit wise logical OR operation would also form this same combination.

As shown in FIG. 10 the result of these manipulations places the bit plane data for all pixels in contiguous locations. The plane bits are not in consecutive order, however, each bit plane is easily extracted. Data word 170 includes bit planes A, C, E and G. Data word 172 includes bit planes B, D, F and H. Data word 174 includes bit planes I, K, M and O. Data word 176 includes bit planes J, L, N and P.

The listing below incorporates the algorithm just described. This listing shows that the Texas Instruments TMS320C6400 digital signal processor can operate on 16 16-bit pixels packed into 8 32-bit data words simultaneously. This listing incorporates additional instructions of the TMS320C6400 digital signal processor that will be described below in the comments. The data registers are given "A" and "B" prefixes denoting the A and B register files with the corresponding execution units of the TMS320C6400. Comments in this listing explain the operation performed.

```
/* Loading 8 data words each with 16 packed pixels via four
 * double word load instructions */
<1>  LDDW  * A_i_ptr++[4],   B_p7p6:B_p5p4
<1>  LDDW  *-A_i_ptr[3],     B_p3p2:B_p1p0
<2>  LDDW  * B_i_ptr++[4],   A_p7p6:A_p5p4
<2>  LDDW  *-B_i_ptr[3],     A_p3p2:A_p1p0
/* First data swap by bytes   */
     PACKH4  B_p7p6, B_p5p4, B_p7654H
     PACKL4  B_p7p6, B_p5p4, B_p7654L
     PACKH4  B_p3p2, B_p1p0, B_p3210H
     PACKL4  B_p3p2, B_p1p0, B_p3210L
     PACKH4  A_p7p6, A_p5p4, A_p7654H
     PACKL4  A_p7p6, A_p5p4, A_p7654L
     PACKH4  A_p3p2, A_p1p0, A_p3210H
     PACKL4  A_p3p2, A_p1p0, A_p3210L
/* First bit shuffle of each data word   */
     SHFL    B_p7654H, B_p7654H1
     SHFL    B_p7654L, B_p7654L1
     SHFL    B_p3210H, B_p3210H1
     SHFL    B_p3210L, B_p3210L1
     SHFL    A_p7654H, A_p7654H1
     SHFL    A_p7654L, A_p7654L1
     SHFL    A_p3210H, A_p3210H1
     SHFL    A_p3210L, A_p3210L1
/* Second bit shuffle of each data word  */
     SHFL    B_p7654H1, B_p7654H2
     SHFL    B_p7654L1, B_p7654L2
     SHFL    B_p3210H1, B_p3210H2
     SHFL    B_p3210L1, B_p3210L2
     SHFL    A_p7654H1, A_p7654H2
     SHFL    A_p7654L1, A_p7654L2
     SHFL    A_p3210H1, A_p3210H2
     SHFL    A_p3210L1, A_p3210L2
/* Masking nibbles to prepare for merge  */
     AND     B_p7654H2, B_mF0F0, B_p7654_ACEG
     ANDN    B_p7654H2, B_mF0F0, B_p7654_BDFH_
     AND     B_p7654L2, B_mF0F0, B_p7654_IKMO
     ANDN    B_p7654L2, B_mF0F0, B_p7654_JLNP_
     AND     B_p3210H2, B_mF0F0, B_p3210_ACEG_
     ANDN    B_p3210H2, B_mF0F0, B_p3210_BDFH
     AND     B_p3210L2, B_mF0F0, B_p3210_IKMO_
     ANDN    B_p3210L2, B_mF0F0, B_p3210_JLNP
     AND     A_p7654H2, A_mF0F0, A_p7654_ACEG
     ANDN    A_p7654H2, A_mF0F0, A_p7654_BDFH_
     AND     A_p7654L2, A_mF0F0, A_p7654_IKMO
     ANDN    A_p7654L2, A_mF0F0, A_p7654_JLNP_
     AND     A_p3210H2, A_mF0F0, A_p3210_ACEG_
     ANDN    A_p3210H2, A_mF0F0, A_p3210_BDFH
     AND     A_p3210L2, A_mF0F0, A_p3210_IKMO_
     ANDN    A_p3210L2, A_mF0F0, A_p3210_JLNP
/* Rotate half the data words to prepare for merge  */
     ROTL    B_p3210_ACEG_, 28, B_p3210_ACEG
     ROTL    B_p7654_BDFH_, 4, B_p7654_BDFH
     ROTL    B_p3210_IKMO_, 28, B_p3210_IKMO
     ROTL    B_p7654_JLNP_, 4, B_p7654_JLNP
     ROTL    A_p3210_ACEG_, 28, A_p3210_ACEG
     ROTL    A_p7654_BDFH_, 4, A_p7654_BDFH
     ROTL    A_p3210_IKMO_, 28, A_p3210_IKMO
     ROTL    A_p7654_JLNP_, 4, A_p7654_JLNP
/* Merge of nibble data  */
     ADD     B_p7654_ACEG, B_p3210_ACEG, B_p_ACEG
     ADD     B_p7654_BDFH, B_p3210_ACEG, B_p_BDFH
     ADD     B_p7654_IKMO, B_p3210_ACEG, B_p_IKMO
     ADD     B_p7654_JLNP, B_p3210_ACEG, B_p_JLNP
     ADD     A_p7654_ACEG, A_p3210_ACEG, A_p_ACEG
     ADD     A_p7654_BDFH, A_p3210_ACEG, A_p_BDFH
     ADD     A_p7654_IKMO, A_p3210_ACEG, A_p_IKMO
     ADD     A_p7654_JLNP, A_p3210_ACEG, A_p_JLNP
```

-continued

```
/* Word (16 bit) shuffle to order bit plane data   */
    PACKH2  B_p_ACEG, A_p_ACEG, B_ACAC
    PACK2   B_p_ACEG, A_p_ACED, B_EGEG
    PACKH2  B_p_BDFH, A_p_BDFH, B_BDBD
    PACK2   B_p_BDFH, A_p_BDFH, B_FHFH
    PACKH2  A_p_IKNO, B_p_IKMO, A_IKIK_
    PACK2   A_p_IKNO, B_p_IKMO, A_MOMO_
    PACKH2  A_p_JLNP, B_p_JLNP, A_JLJL_
    PACK2   A_p_JLNP, B_p_JLNP, A_NPNP_
/* Byte (8 bit) shuffle to order bit plane data   */
    PACKH4  B_ACAC, B_BDBD, B_AABB
    PACKL4  B_ACAC, B_BDBD, B_CCDD
    PACKH4  B_EGEG, B_FHFH, B_EEFF
    PACKL4  B_EGEG, B_FHFH, B_GGHH
    PACKH4  A_IKIK, A_JLJL_, A_IIJJ_
    PACKL4  A_IKIK, A_JLJL_, A_KKLL_
    PACKH4  A_MOMO_, A_NPNP_, A_MNNN_
    PACKL4  A_MOMO_, A_NPNP_, A_OOPP_
/* Byte (8 bit) exchange to order bit planes   */
    SWAP4   A_IIJJ, A_IIJJ
    SWAP4   A_KKLL_, A_KKLL
    SWAP4   A_MMNN_, B_MMNN
    SWAP4   A_OOPP_, B_OOPP
/* Storing 8 data words with 16 packed bit planes via four
 * double word store instructions   */
<3> STDW  B_AABB:B_CCDD, *+B_o_ptr[0]
<3> STDW  B_EEFF:B_GGHH, *+B_o_ptr[1]
<3> STDW  A_IIJJ:A_KKLL, *+B_o_ptr[2]
<3> STDW  B_MMNN:B_OOPP *+B_o_ptr[3]
```

This code uses rotate instructions RDTL rather than shift right unsigned (SHRU) and shift left (SHL) of the previous example. The RDTL by 28 bits corresponds to the shift right unsigned SHRU by 4 bits. The RDTL by 4 bits corresponds to the shift left SHL by 4 bits. Thus any instruction shifts the input data left and/or right by 4 bits without sign extension will work.

Figure 11:
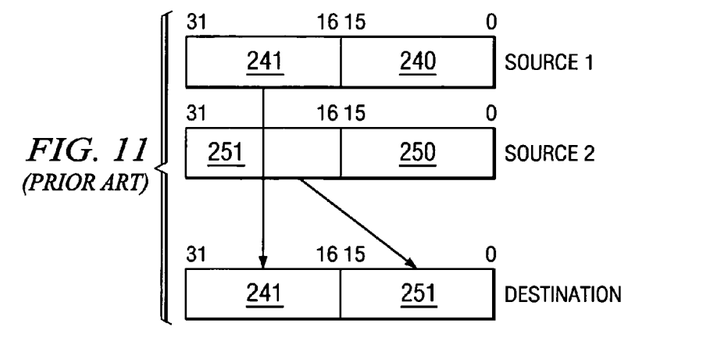
FIG. 11 illustrates the data operation of a known instruction that packs the high half-words of two source operands into a destination operand.
Figure 12:
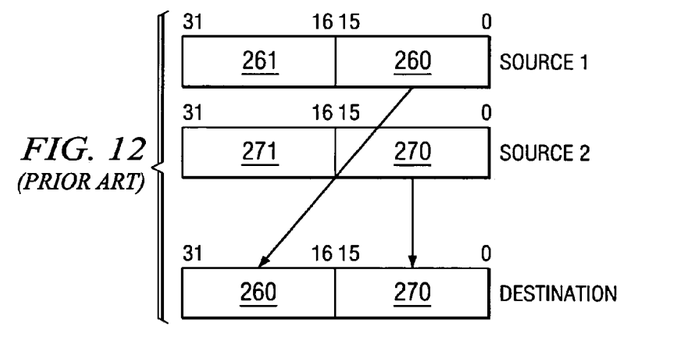
FIG. 12 illustrates the data operation of a known instruction that packs the low half-words of two source operands into a destination operand.

The PACKH2 and PACK2 instructions are similar to the PACKH4 and PACK4 instructions except that they operate on data words (16 bits) rather than bytes. FIG. 11 illustrates the operation of the pack high words PACKH2 instruction. The high words (16 bits) of each source operand are packed into the destination. High word 241 of the first source operand source1 becomes the high word of the destination operand. High word 251 of the second source operand source2 becomes the low word of the destination operand. FIG. 12 illustrates the operation of the pack low words PACK2 instruction. The low words (16 bits) of each source operand are packed into the destination. Low word 260 of the first source operand source1 becomes the high word of the destination operand. Low word 270 of the second source operand source2 becomes the low word of the destination operand.

Figure 13:
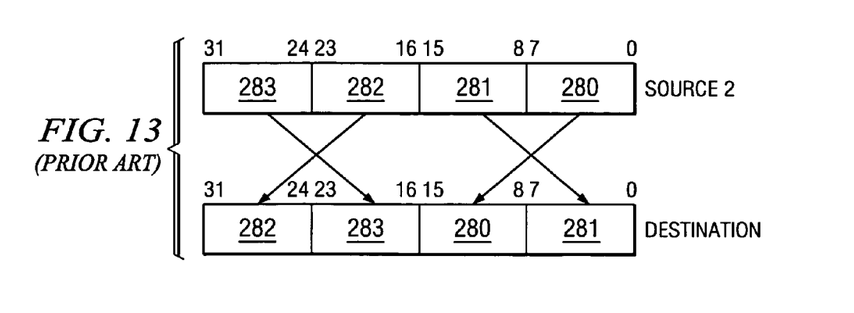
FIG. 13 illustrates the data operation of a known instruction that swaps bytes of respective half-words of one source operand into a destination operand.

FIG. 13 illustrates the operation of the swap bytes in each half word instruction SWAP4. As illustrated in FIG. 13, this instruction swaps the upper byte (8 bits) with the lower byte (8 bits) of each 16-bit word of the second source operand source2. Specifically, the high byte 243 of the upper half-word of source2 is moved to the lower byte of the upper half-word of the destination. The low byte 242 of the upper half-word of source2 is moved to the upper byte of the upper half-word of the destination. The high byte 241 of the lower half-word of source2 is moved to the upper byte of the lower half-word of the destination. The low byte 241 of the lower half-word of source2 is moved to the lower byte of the lower half-word of the destination.

Figure 14:
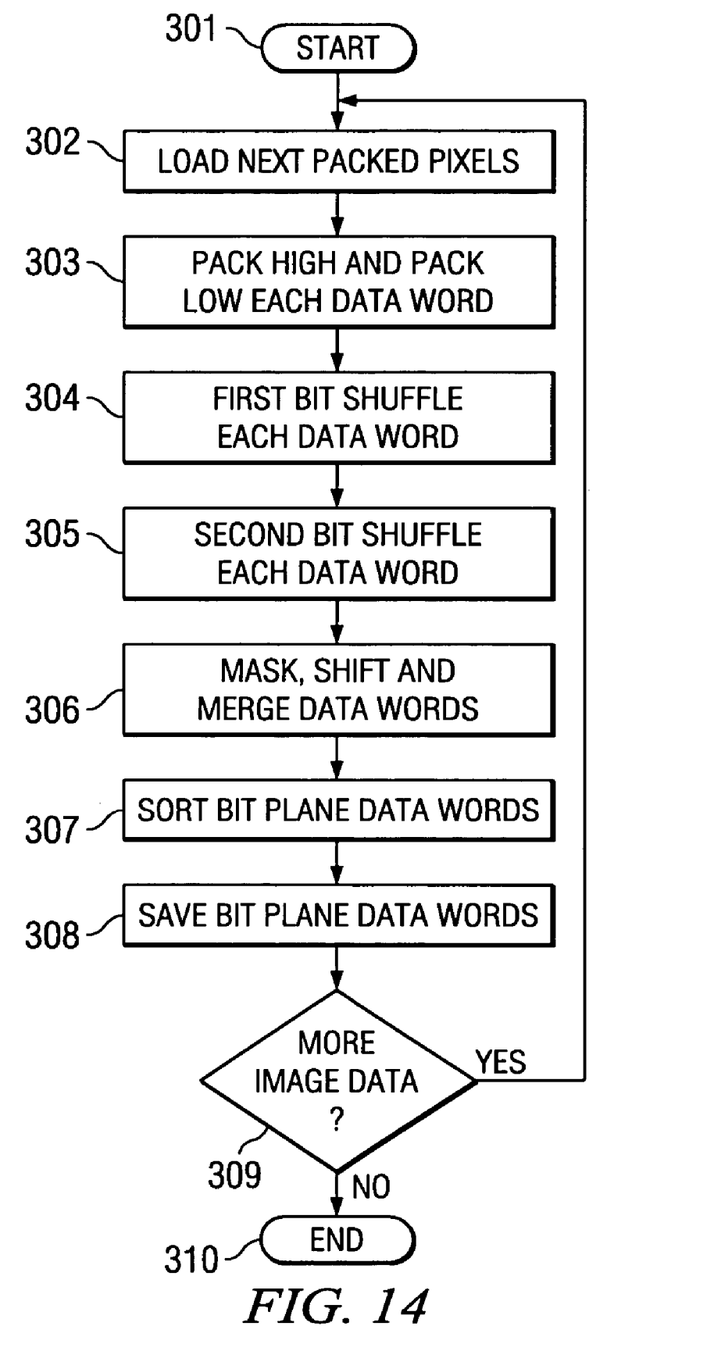
FIG. 14 is flow chart of the process of converting pixel data into bit plane data in accordance with this invention.

FIG. 14 illustrates the process of converting pixel data into bit plane data. The process begins at start block 301. The process loads the next set of packed pixels (processing block 302). The number of packed pixel data words loaded depends on the register capacity of the data processing apparatus and the relationship between the pixel bit length and the data word length. In the previous examples, there are two 16-bit pixels packed into each 32bit data word and the apparatus loads 4 or 8 of these packed data words. Next each data word is shuffled via a pack high and a pack low instruction (processing block 303). The data width of the shuffled part is half the data width of the pixel data. The process subjects resulting data words to a first bit shuffle (processing block 304) and a second bit shuffle (processing block 305). The bit shuffle was described above in conjunction with FIG. 5. The process next masks, shifts and merges the shuffled data words (processing block 307). The mask size corresponds to one quarter of the original pixel data length. In the examples of this application the mask length is four bits. The masking of this example is used because the target data processor (Texas Instruments TMS320C6400) does not have a set of pack instructions having 4-bit length. If such an instruction was available, it could be used here rather than the mask, shift and merge operations described above. The process next sorts the bit plane data words (processing block 307). Recall the original example produced bit plane data that was not sorted in the bit order (FIG. 10). The second example shows how this bit plane data can be sorted into order from most significant to least significant bit planes. Decision block 309 determines if there is additional image data to be converted. If not (No at decision block 309), the process is complete and exits via end block 310. If there is additional image data (Yes at decision block 309), the control returns to processing block 302 to load the next pixel data.

The bitwise shuffle instruction SHFL allows effective sort of the bit-planes in parallel. This achieves very high efficiency. The prior art approach employs the fundamentally information-losing activity of extracting one bit of interest and discarding the rest. Thus the prior art produces much greater memory traffic. This invention moves all the bits together. In each step all bits move closer to their final destination. As a result, this invention can corner turn or planarize 256 bits in 12 cycles, for a rate of 21.33 bits/cycle. This is more than ten times faster than the estimated operational rate of the prior art approach.

Another prior art approach employs custom hardware to transpose the data and produce the desired bit plane data. This custom hardware requires silicon area not devoted to general purpose data processing operations. This results in additional cost in manufacture and design of the digital signal processor incorporating this custom hardware. Use of this custom hardware would also require additional programmer training and effort to learn the data processing performed by the custom hardware. In contrast, this invention employs known instructions executed by hardware which could be used in other general purpose data processing operations.

This technique is useful in many fields. The image data compression standards JPEG 2000 and MPEG4 both employ wavelet schemes that rely on zero-tree decomposition of the wavelets. These zero-tree schemes benefit from planarization of the data prior to processing. Pulse-modulated display devices, such as the Texas Instruments Digital Mirror Device (DMD) and various liquid crystal displays (LCD) often employ bit-plane-oriented display. In these processes one bit plane is sent to the display at a time and is held in the display for a time proportional to the bit's numeric value. These devices rely on corner-turning as a fundamental operation.

What is claimed is:

1. A method of converting data from an individual data element format having a bit length N into a bit plane format comprising the steps of:

packing plural data elements into corresponding data words;

for each pair of data words corresponding to differing data elements forming a first intermediate data word having the most significant N/2 of bits of the data elements in the pair of data words;

for each pair of data words corresponding to differing data elements forming a second intermediate data word having the least significant N/2 of bits of the data elements in the pair of data words;

bit shuffling said first intermediate data word forming a third intermediate data word;

bit shuffling said second intermediate data word forming a fourth intermediate data word;

bit shuffling said third intermediate data word forming a fifth intermediate data word;

bit shuffling said fourth intermediate data word forming a sixth intermediate data word;

masking said fifth intermediate data word with a first mask alternating groups of 1's and 0's of length N/4 forming a seventh intermediate data word;

masking said fifth intermediate data word with a second mask opposite to said first mask forming an eighth intermediate data word;

masking said sixth intermediate data word with said first forming a ninth intermediate data word;

masking said sixth intermediate data word with said second mask forming a tenth intermediate data word;

merging said seventh and eighth intermediate data words forming a first bit plane data word; and merging said ninth and tenth intermediate data words forming a second bit plane data word.

2. The method of claim 1, further including the steps of:

sorting bit plane data of said first and second bit plane data words by the steps of:

forming an eleventh intermediate data word having the most significant N of bits of the data elements in the first and second bit plane data words;

forming a twelfth intermediate data word having the least significant N of bits of the data elements in the first and second bit plane data words;

forming a thirteenth intermediate data word having the most significant N/2 of bits of the data elements in the eleventh and twelfth intermediate data words;

forming a fourteenth intermediate data word having the least significant N/2 of bits of the data elements in the eleventh and twelfth intermediate data words;

swapping N/2 most significant bits with N/2 least significant bits of each half of thirteenth intermediate data word forming a first sorted bit plane data word; and swapping N/2 most significant bits with N/2 least significant bits of each half of fourteenth intermediate data word forming a second sorted bit plane data word.

3. The method of claim 2, further comprising the step of:

storing the first and second sorted bit plane data words in a memory.

4. The method of claim 1, further comprising the steps of:

recalling said pair of data words from a memory.

* * * * *